US012017767B2

(12) United States Patent
Tsutsui et al.

(10) Patent No.: US 12,017,767 B2
(45) Date of Patent: Jun. 25, 2024

(54) COMMUNICATION MANAGEMENT DEVICE, COMMUNICATION MANAGEMENT SYSTEM, COMMUNICATION MANAGEMENT METHOD, AND COMMUNICATION MANAGEMENT PROGRAM

(71) Applicant: SOFTBANK CORP., Tokyo (JP)

(72) Inventors: Tatsushi Tsutsui, Tokyo (JP); Jutatsu Sai, Tokyo (JP); Kiyoshi Kimura, Tokyo (JP); Chiaki Inui, Tokyo (JP)

(73) Assignee: SOFTBANK, CORP., Tokyo (JP)

( * ) Notice: Subject to any disclaimer, the term of this patent is extended or adjusted under 35 U.S.C. 154(b) by 344 days.

(21) Appl. No.: 17/488,244

(22) Filed: Sep. 28, 2021

(65) Prior Publication Data

US 2022/0017221 A1 Jan. 20, 2022

Related U.S. Application Data

(63) Continuation of application No. PCT/JP2020/003051, filed on Jan. 28, 2020.

(30) Foreign Application Priority Data

Mar. 28, 2019 (JP) ................. 2019-064903

(51) Int. Cl.
*B64C 39/02* (2023.01)
*H04W 4/42* (2018.01)
(Continued)

(52) U.S. Cl.
CPC ............ *B64C 39/024* (2013.01); *H04W 4/42* (2018.02); *H04W 4/90* (2018.02); *H04W 24/04* (2013.01);
(Continued)

(58) Field of Classification Search
CPC ........ B64C 39/024; H04W 4/42; H04W 4/90; H04W 24/04; H04W 24/10; H04W 76/50;
(Continued)

(56) References Cited

U.S. PATENT DOCUMENTS 9,524,648 B1 12/2016 Gopalakrishnan et al.
2016/0344468 A1 11/2016 Harregui et al.
(Continued)

FOREIGN PATENT DOCUMENTS

JP 2000-78069 A 3/2000
JP 2006-82774 A 3/2006
(Continued)

OTHER PUBLICATIONS

Extended European Search Report dated Nov. 22, 2022, of counterpart European Patent Application No. 20779909.9.
(Continued)

*Primary Examiner* — Alan D Hutchinson
(74) *Attorney, Agent, or Firm* — DLA Piper LLP (US)

(57) ABSTRACT

A communication management device provided in a flight vehicle that communicates with a base station management device that manages a plurality of base stations, includes: a first communication unit that transmits and receives control signals of an airframe of the flight vehicle or flight information of the flight vehicle to and from the base station management device; a second communication unit that provides communications among the plurality of wireless terminals as a base station; an acquisition unit that acquires anomaly information indicating that an anomaly of the first communication unit or an anomaly of a flight state of the flight vehicle has occurred, and an anomaly reporting unit that transmits the anomaly information to the base station
(Continued)

management device via the second communication unit when the anomaly information is acquired by the acquisition unit.

9 Claims, 12 Drawing Sheets

(51) Int. Cl.
    *H04W 4/90*         (2018.01)
    *H04W 24/04*       (2009.01)
    *H04W 24/10*       (2009.01)

(52) U.S. Cl.
    CPC ......... *H04W 24/10* (2013.01); *B64U 2201/10* (2023.01)

(58) Field of Classification Search
    CPC ............... H04W 84/00; B64U 2201/10; B64U 2201/20; B64D 45/00; B64D 25/00; G08G 5/0039; H04M 3/00
    See application file for complete search history.

(56) References Cited

U.S. PATENT DOCUMENTS

| | | | |
|---|---|---|---|
| 2017/0069214 A1* | 3/2017 | Dupray | ................ G08G 5/0008 |
| 2018/0098247 A1 | 4/2018 | Gopal et al. | |
| 2019/0260768 A1* | 8/2019 | Mestha | ............... H04L 63/1466 |

FOREIGN PATENT DOCUMENTS

| | | |
|---|---|---|
| JP | 2018-74253 A | 5/2018 |
| JP | 2019-9675 A | 1/2019 |

OTHER PUBLICATIONS

International Search Report dated Apr. 21, 2020, of counterpart International Application No. PCT/JP2020/003051, along with an English translation.

Office Action dated Dec. 21, 2023, of counterpart European Patent Application No. 20779909.9.

\* cited by examiner

| RANK 1 | RANK 2 | RANK 3 | RANK 4 | RANK 5 |
|---|---|---|---|---|
| INCREASE FLIGHT ALTITUDE | MOVE TO PREDETERMINED SAFE AIRSPACE | SEND BACK TO AIRPORT | LAND ON GROUND | WATER LAND ON SEA |

FIG. 3

COMMUNICATION MANAGEMENT DEVICE, COMMUNICATION MANAGEMENT SYSTEM, COMMUNICATION MANAGEMENT METHOD, AND COMMUNICATION MANAGEMENT PROGRAM

TECHNICAL FIELD

This disclosure relates to a communication management device, a communication management system, a communication management method, and a communication management program.

BACKGROUND

A communication system using the high altitude platform system (HAPS), which is known as a high-altitude platform that mounts radio stations on aircraft that stays in the air at high altitudes in which the communication area of base stations becomes wider by distributing radio communication base stations at high altitudes, has been developed in recent years.

For example, unmanned aerial vehicles (UAVs) as an example of the HAPS, are often controlled by global positioning systems (GPS) and other control signals transmitted from satellites and ground base stations. In those instances, the unmanned aerial vehicles may be hijacked and illegally operated by a hacker, for example, by spoofing GPS signals or by hacking into the computer that manages the unmanned aerial vehicles.

To prevent illegal operation by hijacking the unmanned aerial vehicles, a method of wireless communication based on cryptographic technology that is almost impossible to decipher has been developed between the unmanned aerial vehicles and the control source of the unmanned aerial vehicles. For example, for the purpose of improving information security by applying a cryptographic technology that satisfies at least computational security, a method of allowing a plurality of unmanned aerial vehicles to share a common cryptographic key that can guarantee information theoretical security has been proposed (see, for example, Japanese Laid-Open Patent Publication No. 2018-74253).

However, in addition to instances of unauthorized operation due to hijacking, for example, some type of failure may occur in the communications between the unmanned aerial vehicles and the satellite or ground base station so that the unmanned aerial vehicles cannot be controlled.

Therefore, it could be helpful to provide a communication management device, a communication management system, a communication management method, and a communication management program capable of reliably recognizing the occurrence of anomalies in a base station management device when the airframe of a HAPS having a base station function is hijacked by unauthorized access or when the airframe cannot be controlled from the base station management device due to a defect of the airframe.

SUMMARY

We thus provide:

A communication management device provided in a flight vehicle that communicates with a base station management device that manages a plurality of base stations, includes: a first communication unit that transmits and receives control signals of an airframe of the flight vehicle or flight information of the flight vehicle to and from the base station management device; a second communication unit that provides communications among the plurality of wireless terminals as a base station; an acquisition unit that acquires anomaly information indicating that an anomaly of the first communication unit or an anomaly of a flight status of the flight vehicle has occurred, and an anomaly reporting unit that transmits the anomaly information to the base station management device via the second communication unit when the anomaly information is acquired by the acquisition unit.

When anomalies occur, the communication management device transmits anomaly information to the base station management device using a communication unit different from the first communication unit that transmits control signals of the airframe, allowing the occurrence of the anomalies to be reliably recognized by the base station management device.

BRIEF DESCRIPTION OF THE DRAWINGS

FIG. 3 is a diagram illustrating an example of the control conditions in example 1.

DETAILED DESCRIPTION

Example 1

Figure 1:
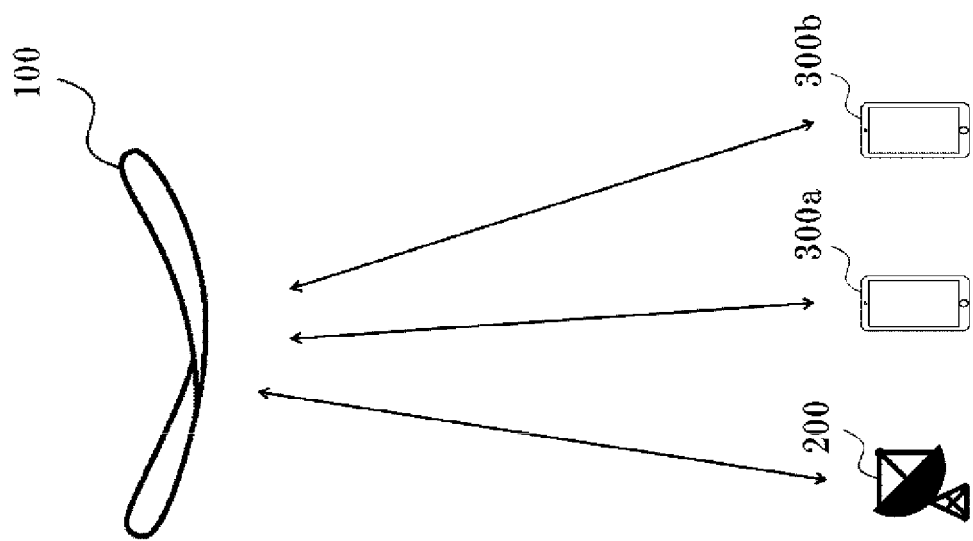
FIG. 1 is a system diagram illustrating a configuration of a communication management system according to an example 1.

FIG. 1 shows a system diagram illustrating a configuration of a communication management system according to an example 1. In the communication management system 1 shown in FIG. 1, a large aircraft 100 that serves as a base station for aviation is directed to an aircraft that configures a high altitude platform HAPS. In addition, the large aircraft 100 is connected by wireless communication to a base station management device 200 that manages base stations, and provides wireless communication among a plurality of wireless terminals 300a and 300b (collectively referred to as wireless terminals 300 unless otherwise explicitly stated) as a base station. The base station management device 200 is directed to a management device that manages the large aircraft 100 that serves as a base station for aviation and a base station on the ground (not shown). The base station management device 200 allocates a communication area to be provided to the wireless terminals 300 by the large aircraft 100, controls the airframe for the large aircraft 100 accordingly, and receives reports from the large aircraft 100 on the flight status and the status of the provision of communication. The wireless terminals 300 may include, for example, a mobile phone, a smart phone, a tablet terminal, a mobile communication module, and an Internet of Things (IoT) device. In example 1, although one large aircraft 100, one base station management device 200, and two wireless terminals 300 are illustrated, example 1 is not limited thereto, and a plurality of devices may be provided. The base stations on the ground are configured to be able to connect to each other via a terrestrial communication network, and the wireless terminals 300 are also able to communicate using the communication network.

The large aircraft 100 flies in the sky for a certain period of time. For example, the sky may be at a high altitude of about 20 km, and a certain period of time may be a period of several weeks, months, or a year. The large aircraft 100 may include, by way of example, a solar plane or a solar airship, which allows for longer duration flights than a normal airplane or airship. When the large aircraft 100 flies in the stratosphere, for example, the stratosphere has a stable airflow, which enables the large aircraft 100 to stay in the air for a long period of time. The altitude at which the large aircraft 100 flies is not limited to about 20 km, and may be higher or lower than 20 km. If the wireless terminal 300 corresponds to a mobile terminal of the conventional terrestrial cellular system, the distance on the technical specification (3GPP described below) that allows the wireless terminal 300 to communicate with the base station, for example, may be about 100 km for LTE. In this example, the altitude of the large aircraft 100 may be about 50 km or less.

In addition to the above examples (solar plane or solar airship), the large aircraft 100 may be anything that has the capability of flying in the air such as airplanes, airships, balloons, helicopters, drones and the like. The large aircraft 100 may also mount various sensors or various cameras. Examples of sensors may include, but are not limited to, sensors capable of performing remote sensing by laser ranging and Doppler radar, for example. Examples of cameras may include, but are not limited to, visible light cameras, infrared cameras, and terrain cameras (stereoscopic cameras). The large aircraft 100 transmits the measurement results of these sensors and cameras and the acquisition results of the information indicating the distribution of the wireless terminals 300 described below to the base station management device 200, thereby enabling the base station management device 200 to assign an appropriate communication area to the large aircraft 100.

Examples will be illustrated below, and the following example of use is common to all examples described in example 2 and below.

(1) When a new base station is to be installed in an area where no base station has been installed, a large aircraft 100 on which a communication management device 110 described below is mounted is caused to stay in the sky for a long period of time, and information on communication including positional altitude information of the wireless terminal 300 is acquired from the wireless terminal 300 in three dimensions. The phrase "acquired . . . in three dimensions" refers to the fact that, although, in general, communication cells based on the terrestrial cellular system are not constructed at positions higher than 50 m above the ground, drones, helicopters, and airplanes mounting the communication function of wireless terminals 300 flying at an altitude exceeding 50 m above the ground are also detected, and the detected information is used as a reference in designing base stations to examine the construction of a three-dimensional cell (a cell with communication coverage not only in the plane but also in the vertical direction, which is capable of performing communication based on the terrestrial cellular system from the ground to an altitude of about 1,000 m above the ground as an example) based on the terrestrial cellular system with HAPS as well as the ground base stations. This enables wireless communication based on the terrestrial cellular system without using aviation radios by causing a large aircraft 100 to constantly stay in the air as a mobile base station to provide mobile communication services even at an altitude of about 50 meters or more above the ground, which has not been covered by the ground base stations conventionally. Not only data communication, including IoT, with drones, helicopters and airplanes, but also, if manned, communication with the crew may be performed as well as the communication on the ground. In addition, if a plurality of drones are provided, the communication may be used for air traffic control and flight control of the drones.

(2) In the event of a catastrophe over a wide area such as a large earthquake, tsunami, large landslide, or large volcanic eruption that renders the plurality of base stations inoperable and where early recovery cannot be expected, temporary base stations need to be set up as soon as possible. It is preferable to set up temporary base stations in areas where the communication environment needs to be restored as soon as possible such as areas with a considerable number of disaster victims. Temporary base stations may include vehicles that can carry mobile base stations that use satellite lines as access lines to the backbone network, and moored balloon systems including wireless communication devices. Various methods are also possible such as drones and entrance radio devices that relay radio signals from operational mobile base stations to expand cell coverage. The large aircraft 100 may be allowed to stay for a long period of time over the disaster area to acquire information on communications from the wireless terminals 300 and also to be used for actual communications between the users. In addition, since the large aircraft 100 may mount cameras, for example, as described above, allowing the images including real-time images imaged by the cameras to be used as a basis for determining whether a temporary base station may be set up, or what area recovery solution may be selected. For example, if a situation such as a road being cut off is immediately recognized from the results of the images imaged by the cameras, for example, vehicles cannot pass the road, and thus another area that is passable and where base stations can be set up may be searched, and a determination may be made immediately whether to use drones and entrance radios for recovery solutions or the large aircraft 100 as the main recovery method. In addition, the location information of the wireless terminals 300 (the wireless terminals 300 are in a communication-enabled state, and the location information, for example, may include the time when the information has been acquired), for example, is mapped to the geographical information including the images imaged by the cameras, for example, in a data processing device (not shown in the drawings), allowing the disaster situation to be recognized from the distribution state of the communication availability of the wireless terminals 300 and the temporal change of the distribution state in a form including real time, which is effective information for disaster countermeasures.

(3) In the event of a mountain accident or marine accident, for example, the large aircraft 100 is caused to stay in the sky for a long period of time or to go around, for example, to acquire information such as information on communication and location information (including time information) from a wireless terminal 300 in a communication-enabled state possessed by a person in distress. A person in distress having encountered a slide or avalanche is likely to be unable to move (the same applies to marine accidents). Even in this example, as long as the wireless terminal 300 is turned on and ready for communication, even if it is out of the area coverage of the existing ground mobile base station, by causing the large aircraft 100 to stay in the sky, the communication management device 110 can receive information such as information on communication and location information (including time information) from the wireless terminal 300 possessed by a person in distress, thereby allowing the person in distress to be found. In addition, the location information of the wireless terminals 300, for example, may be mapped to geographical information including the images imaged by the cameras mounted on the large aircraft 100, existing aerial photographs, and digital maps, thereby allowing the situation around the area in distress to be easily recognized. Since the communication unit described below that the communication management device 110 has a wide communication range (as an example, a radius of about 100 km), the mapping described above, for example, may be performed before searching for a person in distress by a search helicopter, for example, to narrow down the search area, thereby allowing the person in distress to be rescued earlier.

Figure 2:
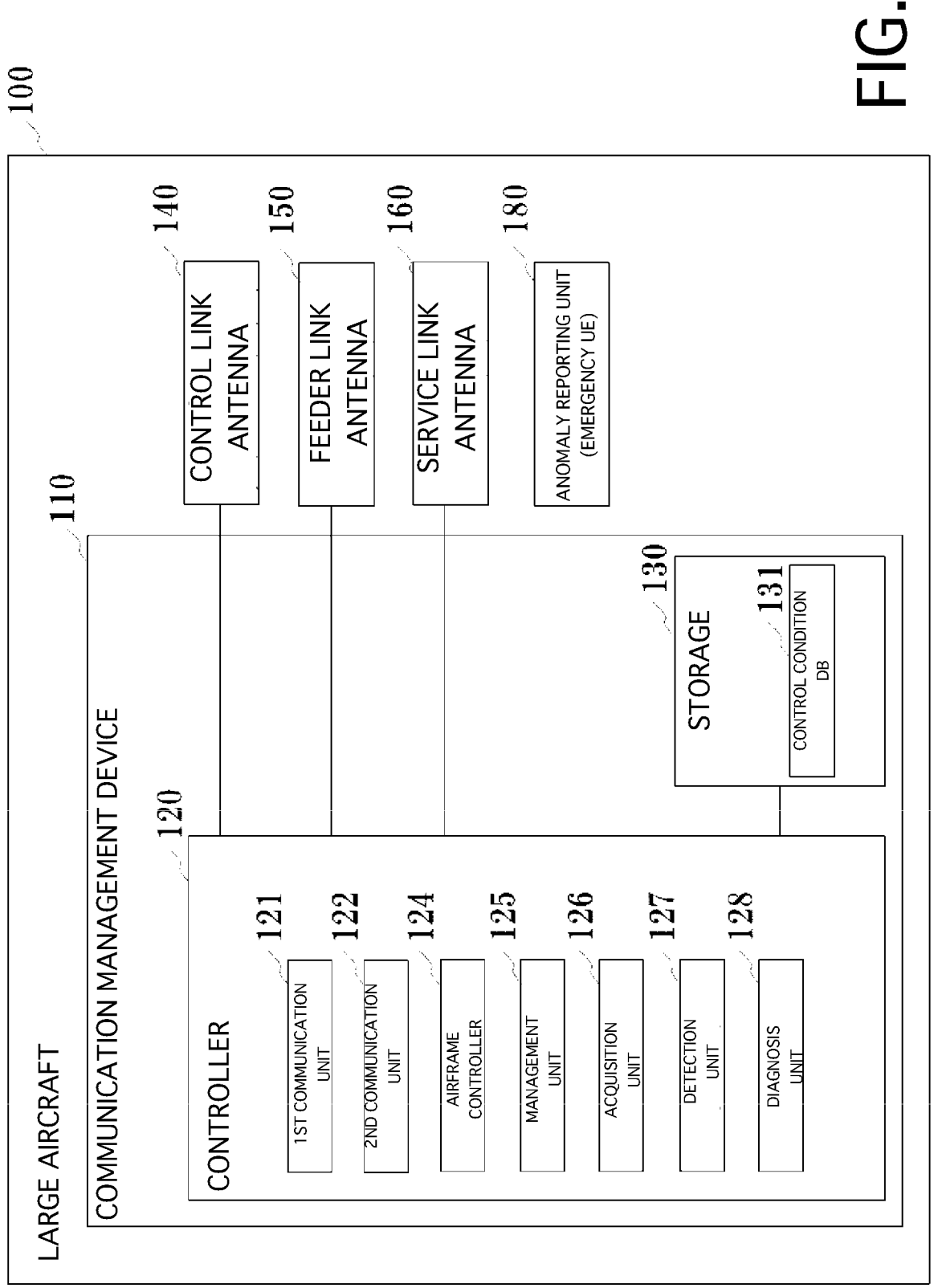
FIG. 2 is a block diagram illustrating a functional configuration of an on-board object including a communication management device mounted on a large aircraft according to example 1.

Next, the functional configuration of the communication management device 110 mounted on the large aircraft 100 will be described. FIG. 2 is a block diagram illustrating a functional configuration of an on-board object including a communication management device 110 mounted on a large aircraft 100 according to example 1. The large aircraft 100 includes a communication management device 110, a control link antenna 140, a feeder link antenna 150, a service link antenna 160, and an anomaly reporting unit (emergency user equipment (UE)) 180. As shown in FIG. 2, the communication management device 110 is directed to a device provided in the large aircraft 100, and includes a controller 120 and a storage 130.

The storage 130 stores a control condition database 131. The control conditions are stored in the control condition database 131. The control condition is directed to a condition that defines the order in which the airframe is controlled as an autonomous flight mode when anomalies occur in the large aircraft 100. The autonomous flight mode is directed to a mode in which the airframe of the large aircraft 100 that has been controlled by instructions from the base station management device 200 in a normal situation in which no anomaly has occurred in the large aircraft 100, is controlled by a program preset as a control to fly autonomously for an emergency.

FIG. 3 is a diagram illustrating an example of the control conditions in example 1. In FIG. 3, ranks 1 to 5 are defined as the order in which the airframe is controlled. The ranks 1 to 5 are assigned higher values depending on the magnitude of the effect on the airframe control depending on the nature of the defects of the airframe. For example, the defects of the airframe may be ranked based on sensing data of various sensors of the airframe indicated by the anomaly information, operating status of the equipment, and information indicating the availability of control, for example. Rank 1 is associated with the control to increase the flight altitude to the predetermined flight altitude, rank 2 is associated with the control to move to the predetermined safe airspace, rank 3 is associated with the control to land on the ground predetermined as the landing area in an emergency, and rank 5 is associated with the control to land on the sea predetermined as the water landing area in an emergency. The ranks 1 to 5 may be the order in which the airframe control of the large aircraft 100 is easy, or may be the rank of an emergency situation. In addition, a plurality of landing areas and water landing areas may be defined, and the landing area and water landing area closest to the flight position of the large aircraft 100 in which the anomaly has occurred may be selected.

The controller 120 is connected to a control link antenna 140, a feeder link antenna 150, a service link antenna 160, and an anomaly information reporting unit (emergency UE) 180 mounted on the large aircraft 100. The controller 120 also includes a first communication unit 121, a second communication unit 123, an airframe controller 124, and a management unit 125.

The first communication unit 121 communicates with the base station management device 600 via the control link antenna 140 in control link communication, and transmits and receives information on the airframe of the large aircraft 100. The control link antenna 140 is directed to an antenna provided on the airframe of the large aircraft 100 and is used for communication of information on the airframe between the large aircraft 100 and the base station management device 200. The control link communication refers to the communication between the base station management device 200 and the large aircraft 100 relating to the control of the large aircraft 100, and for the large aircraft 100, it corresponds to the communication using the control link antenna 140. The information on the airframe is directed to, for example, control signals of the airframe transmitted from the base station management device 200 to the large aircraft 100, or status signals of the large aircraft 100 transmitted from the large aircraft 100 to the base station management device 200. The control signals of the airframe correspond to signals indicating the operation control of the airframe, and the status signals correspond to signals indicating the flight status of the airframe that may include the current coordinates of the airframe in the air, the velocity, the direction of travel, and the tilt level of the airframe, respectively, as well as the status of each portion of the airframe and the sensing data sensed by various sensors to detect the surrounding conditions.

The second communication unit 122 provides feeder link communication with a base station on the ground (not shown) via the feeder link antenna 150, and provides service link communication to the wireless terminals 300 via the service link antenna 160. The feeder link communication is directed to communication between the large aircraft 100 and a base station device (not shown) on the ground using the feeder link antenna 150 provided on the airframe of the large aircraft 100. Further, the service link communication is directed to communication that provides communications among a plurality of wireless terminals 300 using the service link antenna 160 provided on the large aircraft 100.

In addition, the second communication unit 122 transmits anomaly information indicating that an anomaly has occurred to the base station management device 200 when an anomaly situation such as a communication error or failure of the first communication unit 121 due to unauthorized access from outside, for example, occurs. The anomaly information may include status information that indicates the status of the airframe. That is, the second communication unit 122 transmits the anomaly information to the base station management device 200 using the feeder link communication or the service link communication when the anomaly information is acquired by the acquisition unit 126. The anomaly information is directed to information indicating the status of the large aircraft 100, and under normal conditions when no anomaly is occurring, the status signals of the large aircraft 100 are transmitted to the base station management device 200 by the first communication unit 121. However, if an anomaly occurs in the first communication unit 121, the second communication unit 122 may be used to inform the base station management device 200 of the anomaly situation.

The airframe controller 124 controls the airframe of the large aircraft 100 according to the control signals of the airframe received from the base station management device 200 by the first communication unit 121. For example, the airframe controller 124 controls the direction of travel and the velocity of flight according to the coordinates and velocity indicated by the control signals of the airframe. When anomaly information indicating that an anomaly has occurred in the large aircraft 100 is acquired by the acquisition unit 126, the airframe controller 124 controls the large aircraft 100 by switching the flight mode to the autonomous flight mode. The airframe controller 124 may transmit an error to the anomaly reporting unit 180 if the control by switching to the autonomous flight mode is not possible.

The management unit 125 manages the service link communications provided by the large aircraft 100 to the wireless terminals 300. For example, the management unit 125 acquires the number and positions of the wireless terminals 300 on the ground based on the information on the communications between the large aircraft 100 and the wireless terminals 300, and transmits the acquired information on the number and positions of the wireless terminals 300 and the information indicating the communication quality to the base station management device 200 via the first communication unit 121.

The detection unit 127 detects an anomaly of the first communication unit 121. For example, the detection unit 127 monitors whether the first communication unit 121 is transmitting or receiving information at a predetermined interval to or from the base station management device 200, and detects an anomaly when the detection unit 127 determines that no information is being transmitted or received at the predetermined interval. When the detection unit 127 detects an anomaly, it notifies the anomaly information to the acquisition unit 126.

The diagnosis unit 128 diagnoses the flight status of the large aircraft 100. For example, the diagnosis unit 128 acquires flight information from the airframe controller 124 at predetermined intervals, and compares the acquired flight information to the control signals received by the large aircraft 100 from the base station management device 200 via the first communication unit 121. The diagnosis unit 128 diagnoses that the flight status of the large aircraft 100 is normal if the comparison shows that the information matches the control signals, and diagnoses that an anomaly occurs in the flight status of the large aircraft 100 if the comparison shows that the information do not match the control signals. When the diagnosis unit 128 diagnoses that an anomaly occurs in the flight status of the large aircraft 100, it notifies the anomaly information to the acquisition unit 126.

The acquisition unit 126 acquires the anomaly information by receiving the notification of the anomaly information of the first communication unit 121 from the detection unit 127 or the anomaly information of the flight status of the large aircraft 100 from the diagnosis unit 128. When the acquisition unit 126 acquires the anomaly information, the acquired anomaly information is transmitted to the anomaly reporting unit 180.

The anomaly reporting unit 180 is directed to an emergency UE provided on the large aircraft 100, for example, a terminal such as a smart phone. Although the anomaly reporting unit 180 is independent from the internal network of the controller 120 and does not receive information from the controller 120 under normal conditions, the anomaly reporting unit 180 may accept some recovery commands, for example, in an emergency such as when an anomaly occurs in the controller 120. Recovery commands correspond to commands for recovering an anomaly that has occurred in the large aircraft 100, and includes the anomaly information described above. Specifically, when the anomaly reporting unit 180 receives the anomaly information from the acquisition unit 126, it transmits the received anomaly information to the base station management device 200 via the third communication unit 423 (see FIG. 7) or the second communication unit 122. The anomaly reporting unit 180 also transmits an anomaly to the base station management device 200 when an error occurs in the execution of the autonomous flight mode by the airframe controller 124.

Figure 4:
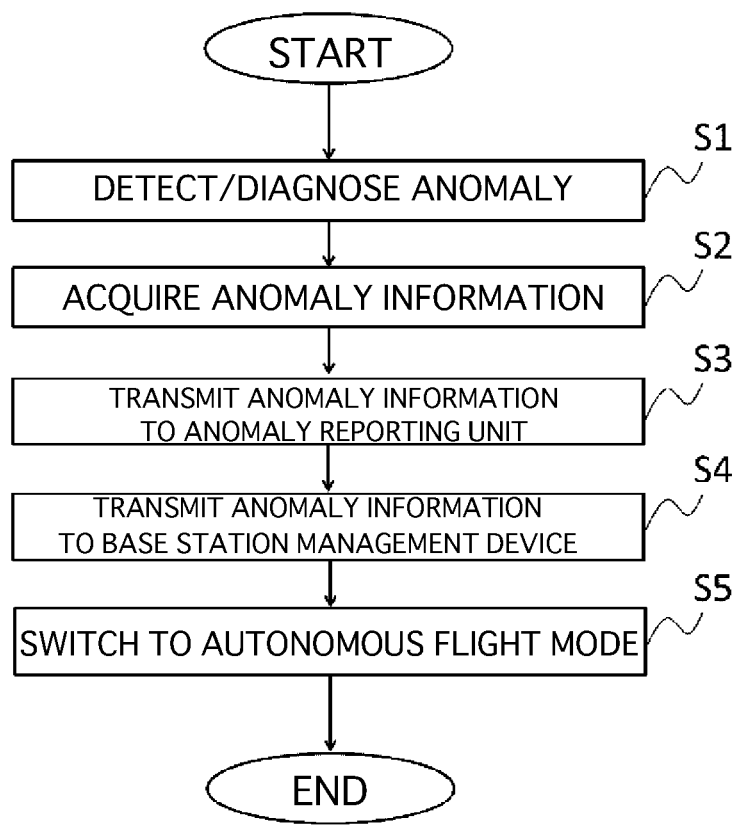
FIG. 4 is a flowchart illustrating a flow of the anomaly detection process according to example 1.

FIG. 4 is a flowchart illustrating a flow of the anomaly detection process according to example 1. The detection unit 127 or the diagnosis unit 128 detects or diagnoses an anomaly of the large aircraft 100 (step S1). Specifically, the detection unit 127 detects an anomaly of the first communication unit 121 and transmits anomaly information indicating the detected anomaly to the acquisition unit 126. Alternatively, the diagnosis unit 128 diagnoses an anomaly in the flight status of the large aircraft 100 and transmits the anomaly information indicating the diagnosed anomaly to the acquisition unit 126.

The acquisition unit 126 acquires the anomaly information (step S2). Specifically, the acquisition unit 126 acquires the anomaly information by receiving the anomaly information from the detection unit 127 or the diagnosis unit 128. The acquisition unit 126 transmits the anomaly information acquired in step S2 to the anomaly reporting unit 180 (step S3). The anomaly reporting unit 180 transmits the anomaly information received in step S3 to the base station management device 200 via the third communication unit 423 or the second communication unit 122 (step S4). The airframe controller 124 switches the airframe control that has been controlled by commands by the base station management device 200, to the autonomous flight mode (step S5).

Figure 5:
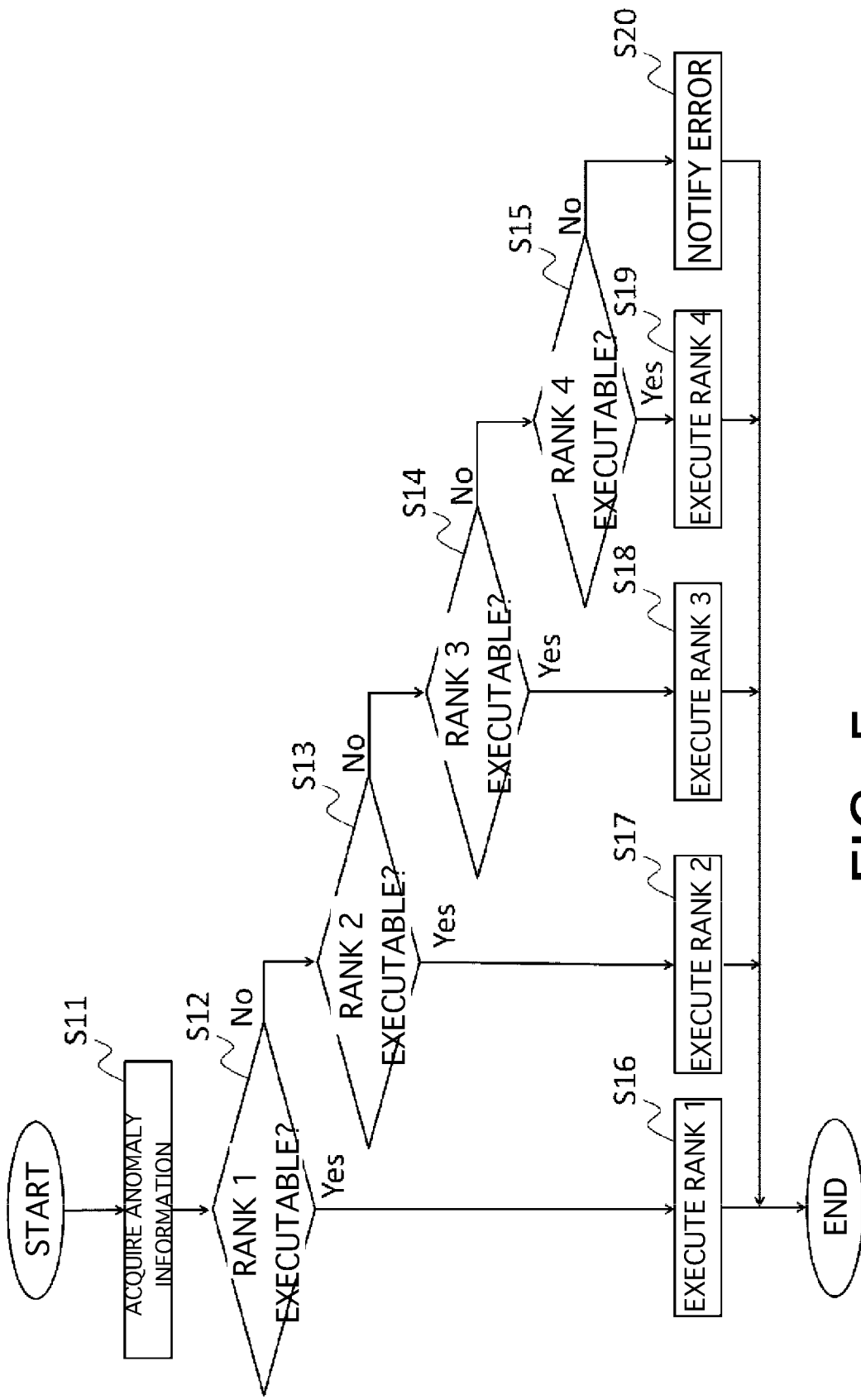
FIG. 5 is a flowchart illustrating a flow of the process of selecting the control to be executed by the airframe controller in switching to the autonomous flight mode.

FIG. 5 is a flowchart illustrating a flow of the process of selecting the control to be executed by the airframe controller 124 in switching to the autonomous flight mode. The airframe controller 124 acquires the anomaly information through the acquisition unit 126 (step S11). The airframe controller 124 performs determinations in step S12 to step S15 in accordance with the control conditions stored in the control condition database 131. For example, if ranks 1 to 5 shown in FIG. 3 are defined as an execution order as the control conditions, the airframe controller 124 determines whether the first control, "increase the flight altitude," indicated by rank 1 is executable (step S12). Specifically, the airframe controller 124 determines to which rank 1 to rank 4 the anomaly information corresponds, based on sensing data of various sensors of the airframe indicated by the anomaly information, operation status of the equipment, and information indicating whether control is possible, and executes the control corresponding to the corresponding rank. If the airframe controller 124 determines that the rank 1 is executable (step S12: Yes), the airframe controller 124 executes control to increase the flight altitude of the large aircraft 100 (step S16). If the airframe controller 124 determines that rank 1 is not executable (step S12: No), it determines whether the second control, "move to a safe airspace," indicated by rank 2 is executable (step S13). If the airframe controller 124 determines that rank 2 is executable (step S13: Yes), the airframe controller 124 executes control to move the large aircraft 100 to a safe airspace (step S17). If the airframe controller 124 determines that rank 2 is not executable (step S13: No), it determines whether the third control, "return to the airport," indicated by rank 3 is executable (step S14). If the airframe controller 124 determines that the rank 3 is executable (step S14: Yes), the airframe controller 124 executes control to return the large aircraft 100 to the airport (step S17). If the airframe controller 124 determines that the rank 3 is not executable (step S14: No), it determines whether the fourth control, "land on the ground," indicated by rank 4 is executable (step S15). If the airframe controller 124 determines that the rank 4 is executable (step S15: Yes), the airframe controller 124 executes control to land the large aircraft 100 on the ground (step S19). In contrast, if the airframe controller 124 determines that the rank 4 is not executable (step S15: No), it notifies an error to the anomaly reporting unit 180 (step S20). If the anomaly reporting unit 180 receives the error from the airframe controller 124 in step S20, it transmits to the base station management device 200 information indicating that control by the autonomous flight mode in the large aircraft 100 is impossible.

As described above, according to the communication management system 1 of example 1, when the anomaly reporting unit 180 receives the anomaly information from the acquisition unit 126, it transmits the anomaly information to the base station management device 200 via the third communication unit 423 or the second communication unit 122 so that even if an anomaly occurs in the first communication unit 121, the base station management device 200 is capable of recognizing the anomaly of the large aircraft 100.

Example 2

Figure 6:
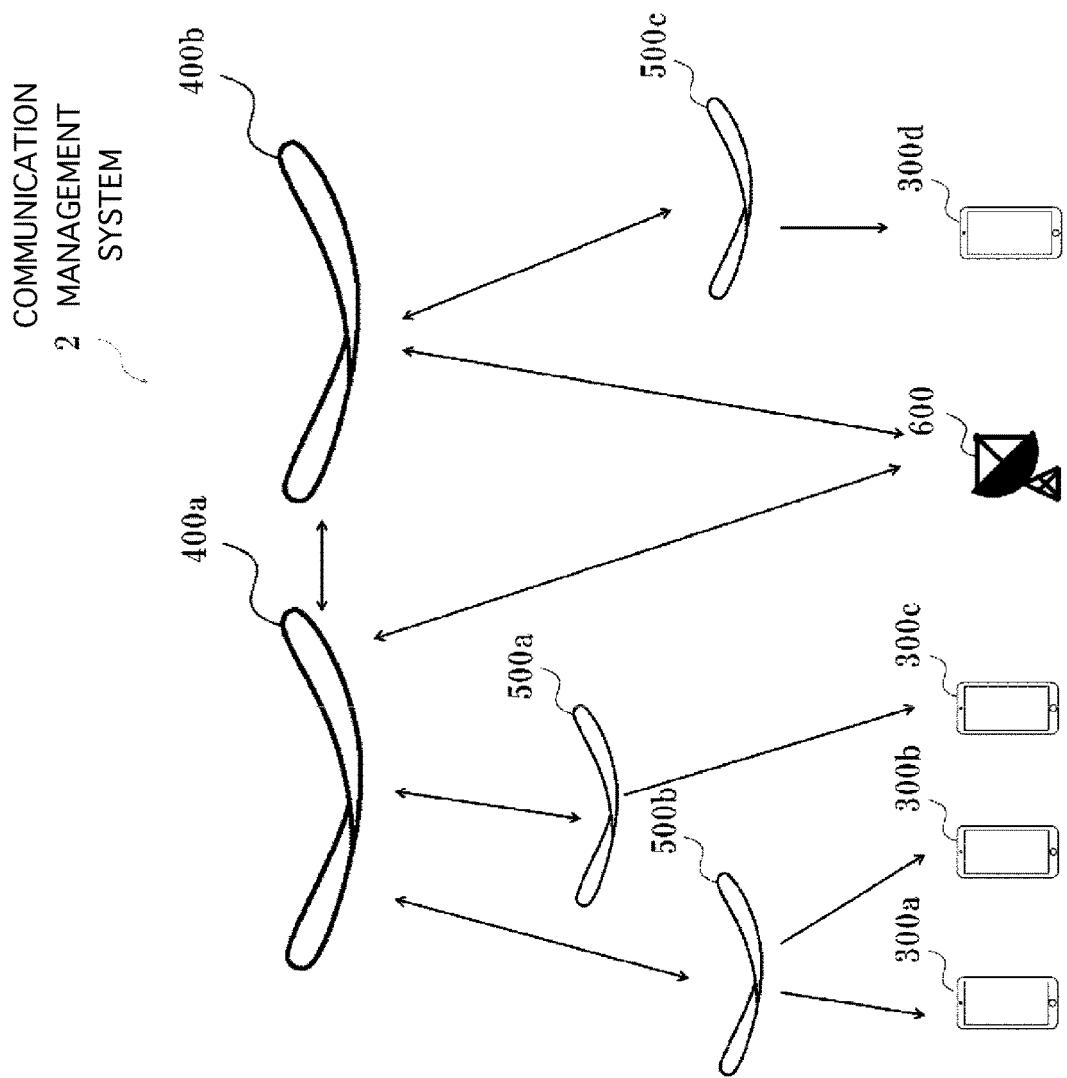
FIG. 6 is a system diagram illustrating an overall configuration of a communication system 2 according to example 2.

FIG. 6 is a system diagram illustrating an overall configuration of a communication system 2 according to example 2. The communication system 2 shown in FIG. 6 includes large aircrafts 400a and 400b, small aircrafts 500a to 500c, wireless terminals 300a to 300d, and a base station management device 600 (unless otherwise explicitly stated, the large aircrafts 400a and 400b are collectively referred to as a large aircraft 400, the small aircrafts 500a to 500c are collectively referred to as a small aircraft 500, and the wireless terminals 300a to 300c are collectively referred to as wireless terminals 300). The large aircraft 400 communicates bi-directionally with the base station management device 600, and the small aircraft 500 provides communication to the wireless terminals 300 that allows communications among a plurality of wireless terminals 300. The large aircraft 400 manages the control of the airframe and the control of the communications by using the small aircraft 500 as a relay device for communications provided to the wireless terminals 300.

Figure 7:
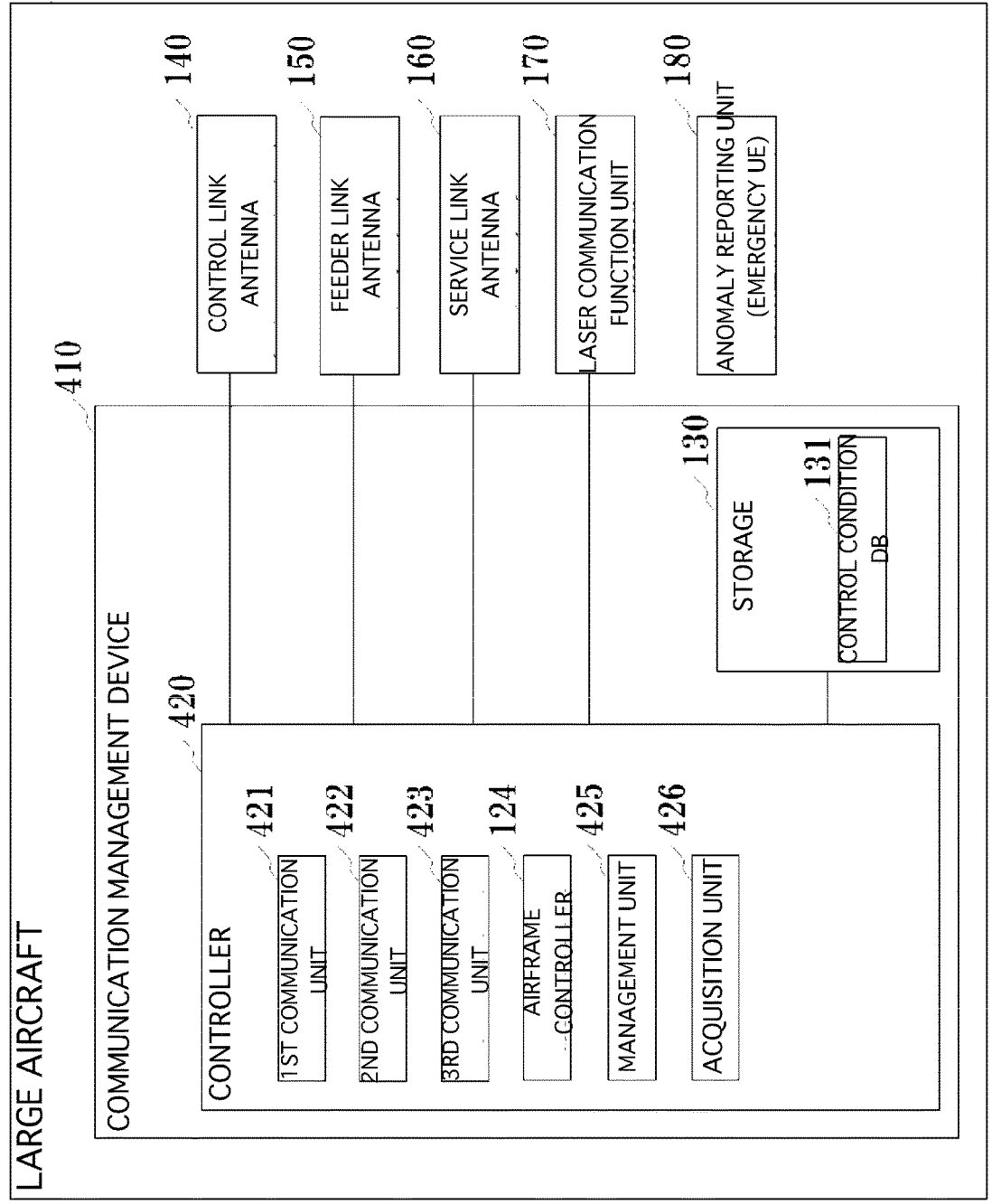
FIG. 7 is a block diagram illustrating a functional configuration of an on-board object including a communication control device mounted on a large aircraft according to example 2.

FIG. 7 is a block diagram illustrating a functional configuration of an on-board object including a communication management device 410 mounted on a large aircraft 400 according to example 2. As shown in FIG. 7, the large aircraft 400 includes a communication management device 410, a control link antenna 140, a feeder link antenna 150, a service link antenna 160, a laser communication function unit 170, and an anomaly reporting unit (emergency UE) 180. The communication management device 410 also includes a controller 420 and a storage 130. The controller 420 includes a first communication unit 421, a second communication unit 122, a third communication unit 423, an airframe controller 124, a management unit 425, and an acquisition unit 426. Descriptions of the same functions and configurations as in example 1 are omitted with the same reference numerals.

The first communication unit 421 communicates with the base station management device 600 via the control link antenna 140 in control link communication, and transmits and receives information on the airframe of the large aircraft 400. The information on the airframe includes the control signals of the airframe transmitted from the base station management device 600 to the large aircraft 100, and the status signals of the small aircraft 500 in addition to the status signals of the large aircraft 400 transmitted from the large aircraft 400 to the base station management device 600.

The second communication unit 422 provides feeder link communication with a base station on the ground (not shown) via the feeder link antenna 150, and provides service link communication to the wireless terminals 300 via the service link antenna 160. In example 2, as shown in FIG. 6, although a configuration in which service link communication is provided to the wireless terminals 300 by the small aircraft 500 that relays the large aircraft 400 is shown, even in this example, when a communication failure occurs in the large aircraft 400, for example, the second communication unit 422 is capable of providing the wireless terminals 300 with the service link communication directly.

The third communication unit 423 communicates bi-directionally with other large aircraft 400 and small aircraft 500 using the laser communication function unit 170. For example, the third communication unit 423 transmits and receives information on the airframe of the small aircraft 500 and information on communication management to and from the small aircraft 500. The laser communication function unit 170 is directed to a functional unit that transmits and receives laser communications that is capable of faster and larger capacity communication than radio wave communication in a wide bandwidth at high frequencies. The third communication unit 423 transmits, for example, control signals of the airframe for the small aircraft 500 to the small aircraft 500 as information on the airframe of the small aircraft 500, and receives status signals of the small aircraft 500 from the small aircraft 500.

The third communication unit 423 communicates with other large aircraft 400 via the laser communication function unit 170 at predetermined intervals. Specifically, the third communication unit 423 receives responses from the other large aircraft 400 in response to signals transmitted at predetermined intervals. When the third communication unit 423 does not receive the responses from the other large aircraft 400 for a predetermined period of time or longer, it determines that an anomaly has occurred in the other large aircraft 400 and detects the anomaly of the large aircraft 400. In addition, when the anomaly occurs in the other large aircraft 400, the third communication unit 423 may, in response to an instruction from the management unit 425, transmit a notification to the small aircraft 500 that has been managed by the large aircraft 400 in which the anomaly has occurred, which notification shows that the own large aircraft manages the small aircraft 500 as a management source. Alternatively, the third communication unit 423 may receive a management request from the small aircraft 500 that has been managed by the large aircraft 400 in which the anomaly has occurred. A management request is directed to a request to manage a small aircraft 500 as a management source of the small aircraft 500.

The management unit 425 manages the flight position of the airframe of the small aircraft 500 and the service link communication provided to the wireless terminals 300 by the small aircraft 500. For example, the management unit 425 acquires distribution information of the wireless terminals 300 on the ground, assigns service link communication serving areas under the management of each of the small aircraft 500 based on the acquisition results, determines an arrangement on the air, or determines a flight position or a turning area of the small aircraft 500, and instructs the small aircraft 500 via the second communication unit 422. Specifically, the management unit 425 acquires the number and locations of the wireless terminals 300 on the ground based on the information on communications performed between the small aircraft 500 and the wireless terminals 300. The management unit 425 also acquires a distribution of the wireless terminals 300 based on the acquired number and positions of the wireless terminals 300. Regarding the information on communications, communication quality information and location information are associated with each wireless terminal 300. This allows the management unit 425 to acquire the information on the communication from the plurality of wireless terminals 300 via the small aircraft 500 to acquire the distribution of the wireless terminals 300.

In addition, when the management unit 425 receives, via the second communication unit 422, information from the small aircraft 500 indicating that a failure of the service link communication by the small aircraft 500 or a defect of the airframe of the small aircraft 500 has occurred, the management unit 425 causes the communication area of the service link that has been managed by the small aircraft 500 in which the failure has occurred to be distributed to the other small aircrafts 500 managed by the large aircraft 400 to be managed by the other small aircrafts 500. Alternatively, the management unit 425 may cause the large aircraft 400 itself to manage the communications in the service link communication area until the service link communication area is redistributed to the plurality of small aircrafts 500.

In addition, when an anomaly in the communication of another large aircraft 400 is detected by the third communication unit 423, the management unit 425 searches for a small aircraft 500 that has been managed by the large aircraft 400 in which the anomaly has occurred, and transmits a notification indicating that the large aircraft 400 manages the small aircraft 500 to the small aircraft 500 via the third communication unit 423.

The acquisition unit 426 acquires the anomaly information by receiving a notification of the anomaly information of the first communication unit 421 or the anomaly information of the flight status of the large aircraft 400 from the base station management device 600. Specifically, the base station management device 600 has a function that detects an anomaly of the first communication unit 421 of the large aircraft 400 or diagnoses a flight status of the large aircraft 400, and when the base station management device 600 detects an anomaly of the first communication unit 421 or diagnoses an anomaly of the flight status of the large aircraft 400, the acquisition unit 426 acquires the anomaly information from the base station management device 600. The anomaly information from the base station management device 600 is received via the second communication unit 422 or the third communication unit 423. When the acquisition unit 426 acquires the anomaly information, the acquired anomaly information is transmitted to the anomaly reporting unit 180.

Figure 8:
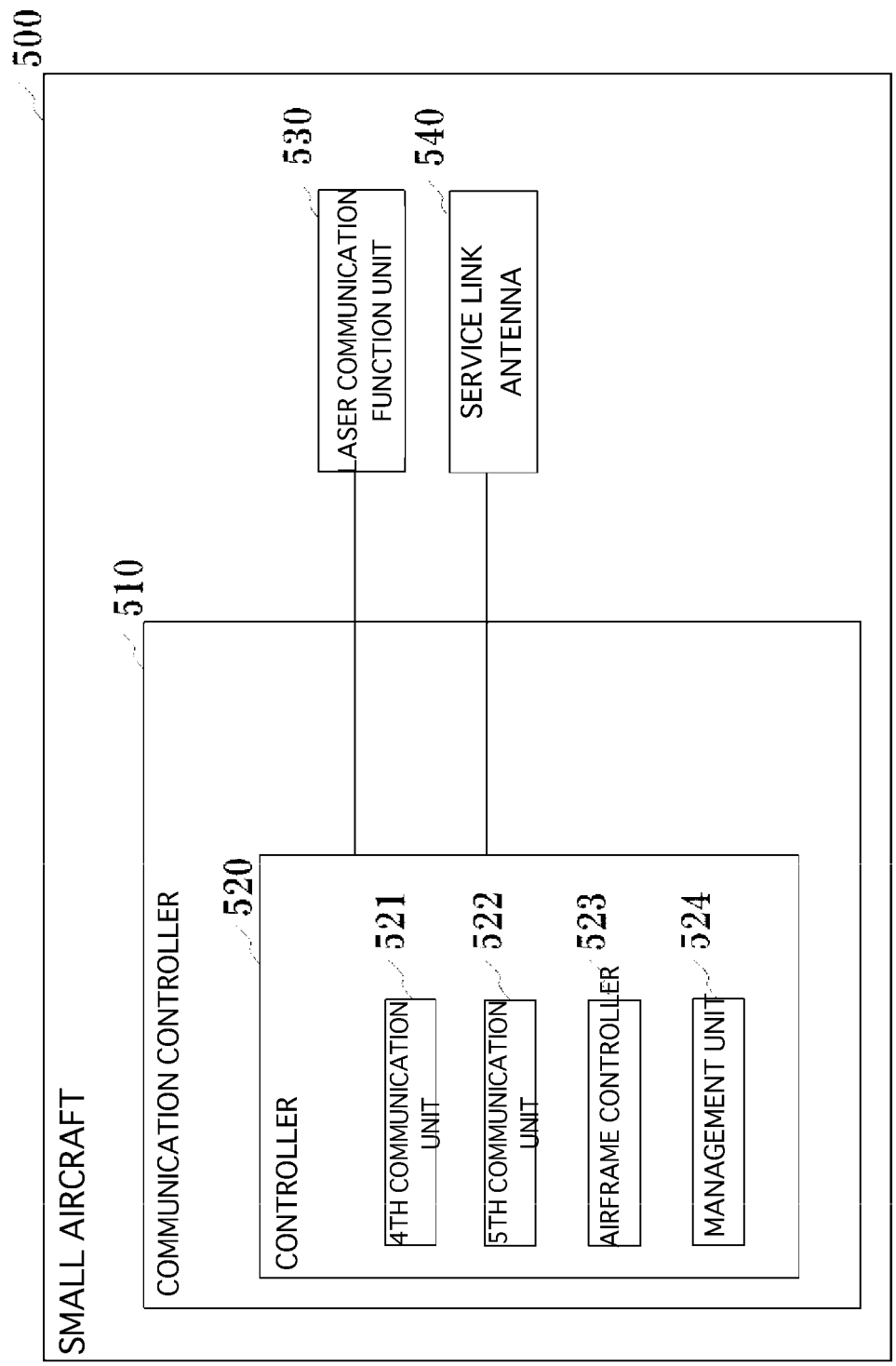
FIG. 8 is a block diagram illustrating a functional configuration of an on-board object including a communication control device mounted on a small aircraft according to example 2.

FIG. 8 is a block diagram illustrating a functional configuration of an on-board object including a communication controller 510 mounted on a small aircraft 500 according to example 2. As shown in FIG. 8, the small aircraft 500 includes a communication controller 510, a laser communication function unit 530, and a service link antenna 540. The communication controller 510 also includes a controller 520.

The fourth communication unit 521 transmits and receives, via the laser communication function unit 530, control signals of the airframe for the small aircraft 500, status signals indicating the status of the small aircraft 500, and information on communications performed between the small aircraft 500 and the wireless terminals 300 via the fifth communication unit 222 to and from the large aircraft 400. The fourth communication unit 521 is also capable of receiving, from the second communication unit 422 of the large aircraft 400, anomaly information indicating that an anomaly has occurred in the airframe of the large aircraft 400. For example, if an anomaly occurs in the large aircraft 400a that manages the small aircraft 500a, the fourth communication unit 521 may receive, from the large aircraft 400b as another large aircraft 400, information on the anomaly of the large aircraft 400a and a notification indicating that the large aircraft 400b manages the small aircraft 500a. Alternatively, the fourth communication unit 521 may transmit a request to a large aircraft 400b flying in the vicinity of the large aircraft 400a in which the anomaly has occurred to cause the large aircraft 400b to manage its own small aircraft 500 as a relay.

The fifth communication unit 222 provides communications among a plurality of wireless terminals 300 as a base station relay via the service link antenna 540. For example, the fifth communication unit 522 receives information from the wireless terminal 300a addressed to the wireless terminal 300b, and transmits the received information to the wireless terminal 300b.

The airframe controller 523 controls the airframe of the small aircraft 500 according to the airframe control signals received from the large aircraft 400 via the fourth communication unit 521. For example, the airframe controller 523 controls the direction of travel and the velocity of flight according to the coordinates and velocity indicated by the control signals of the airframe.

The management unit 524 manages the service link communication provided to the wireless terminals 300 by the fifth communication unit 522. For example, the management unit 524 acquires the number and positions of the wireless terminals 300 on the ground in the service link communication area managed by the own small aircraft 500 based on the information on the communications performed between the small aircraft 500 and the wireless terminals 300, and transmits the acquired information indicating the number and positions of the wireless terminals 300, and the information indicating the communication quality, for example, to the large aircraft 400 via the fourth communication unit 521.

Figure 9:
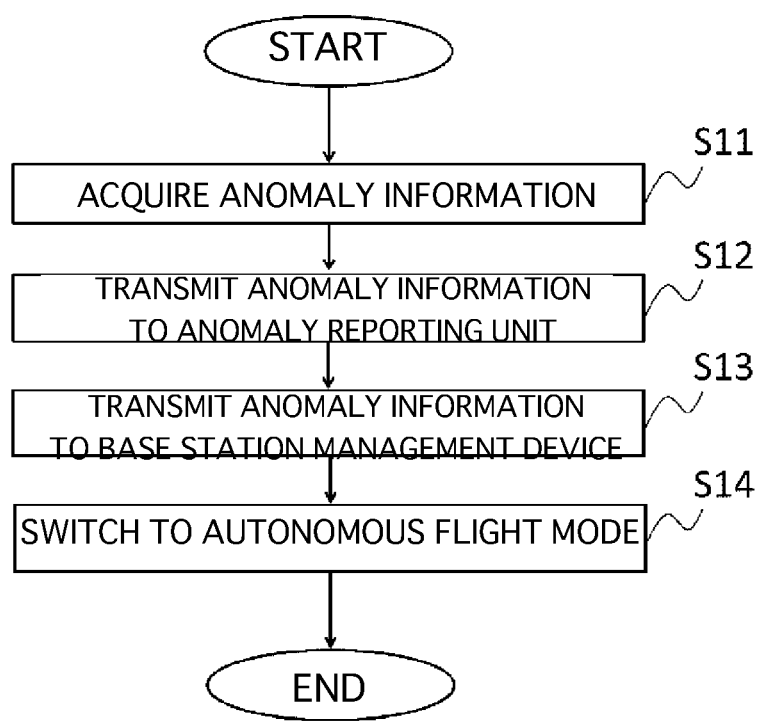
FIG. 9 is a flowchart illustrating a flow of the anomaly detection process according to example 2.

FIG. 9 is a flowchart illustrating a flow of the anomaly detection process according to example 2. The acquisition unit 426 acquires anomaly information of the large aircraft 400 (step S21). Specifically, the acquisition unit 426 acquires the anomaly information by receiving the anomaly information from the base station management device 600 via the second communication unit 422 or the third communication unit 423. Since the processes from step S22 to step S24 are the same as those from step S3 to step S5 of the anomaly detection process described in example 1, the description thereof is omitted.

Figure 10:
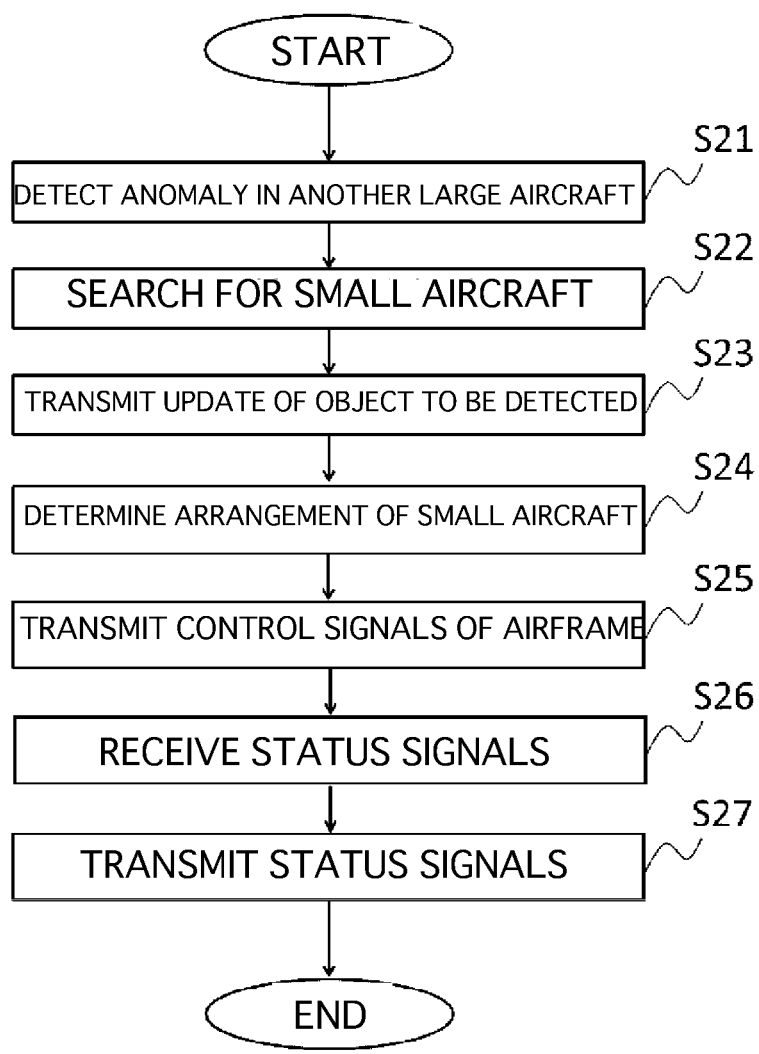
FIG. 10 is a flowchart illustrating a flow of the management process of a small aircraft by a large aircraft according to example 2.

Next, the flow of the recovery process of a small aircraft 500 by a large aircraft 400 that detects a large aircraft 400 in which an anomaly has occurred will be described in example 2. FIG. 10 is a flowchart illustrating a flow of the management process of a small aircraft 500 by a large aircraft 400 according to example 2. In the flowchart shown in FIG. 10, a situation where an anomaly occurs in the large aircraft 400b is described as an example.

The large aircraft 400a detects an anomaly in another large aircraft 400b (step S21). For example, where a large aircraft 400a communicates with another large aircraft 400b at predetermined intervals via the laser communication function unit 170, if the communication fails for a predetermined period of time or longer, it is determined that an anomaly has occurred in the large aircraft 400b, and the anomaly is detected. The large aircraft 400a searches for a small aircraft 500c that has been managed by the large aircraft 400b in which the anomaly has been detected in step S21 (step S22). The large aircraft 400 transmits a notification to the small aircraft 500c searched in step S22 indicating that the large aircraft 400a manages the small aircraft 500c due to the anomaly occurrence of the large aircraft 400b (step S23). The large aircraft 400b also transmits the notification to the base station management device 600.

The large aircraft 400a determines an arrangement of the small aircraft 500, including the small aircraft 500c to be newly managed, in addition to the small aircraft 500a and small aircraft 500b that have been managed so far (step S24). The large aircraft 400a transmits to each of the small aircrafts 500a to 500c corresponding control signals of the airframes for the small aircrafts 500a to 500c (step S25). The large aircraft 400a receives status signals from the small aircrafts 500a to 500c (step S26). The large aircraft 400a transmits the status signals of the large aircraft 400a and the status signals of the small aircrafts 500a to 500c to the base station management device 600 (step S27). As an example, the large aircraft 400b in which an anomaly has occurred switches the control of the airframe to the autonomous flight mode as shown in FIG. 9 to avoid danger without following the control signals from the outside.

Figure 11:
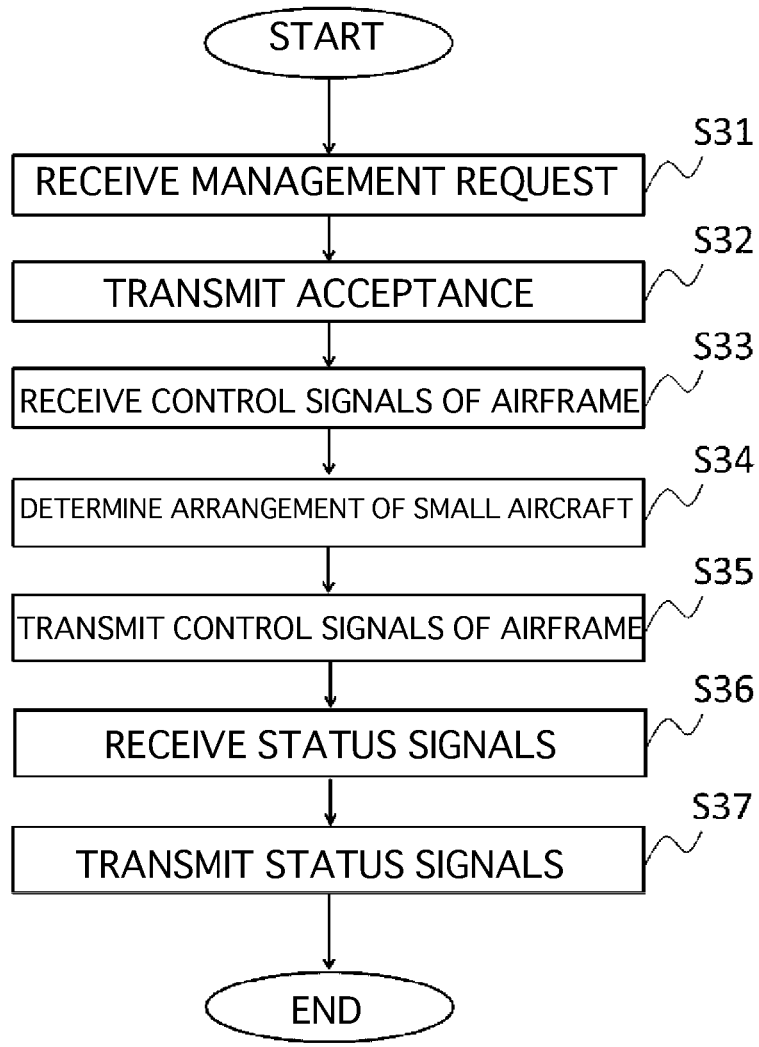
FIG. 11 is a flowchart illustrating a flow of a process of receiving a management request from a small aircraft by a large aircraft according to example 2.

Next, another example of the recovery process for a small aircraft 500 in the event of an anomaly in a large aircraft 400b will be shown. FIG. 11 is a flowchart illustrating a flow of a process of receiving a management request from a small aircraft 500 by a large aircraft 400 according to example 2. In the flowchart shown in FIG. 11, as well as in the flowchart shown in FIG. 8, the situation where an anomaly occurs in the large aircraft 400b is described as an example.

The large aircraft 400a receives a management request from the small aircraft 500c which has been managed by the large aircraft 400b in which the anomaly has occurred (step S31). The large aircraft 400a transmits the information indicating acceptance to the small aircraft 500c (step S32). The large aircraft 400a transmits the information indicating acceptance to the small aircraft 500c and also to the base station management device 600. The large aircraft 400a receives control signals of the airframe for the large aircraft 400a from the base station management device 600 (step S33). The control signals of the airframe include information including a communication area newly managed by the large aircraft 400b due to the anomaly of the large aircraft 400b. The processes from step S34 to step S37 are the same as those from step S24 to step S27 in the flowchart of FIG. 10, and thus the description thereof will be omitted.

As described above, the base station management device 600 according to example 2 is capable of recognizing the anomaly of the large aircraft 400 in the same way as the base station management device 200 of example 1 is capable of recognizing the anomaly of the large aircraft 100. Further, in example 2, the base station management device 600 includes a function that detects an anomaly of the first communication unit 421 of the large aircraft 400 or diagnoses an anomaly of the flight status of the large aircraft 400, allowing the base station management device 600 to immediately recognize an anomaly of the large aircraft 400.

Also, according to example 2, even when a large aircraft 400 manages a small aircraft 500 as a relay aircraft, if an anomaly occurs in the large aircraft 400, the small aircraft 500 requests a management request to another large aircraft 400 flying in the vicinity, allowing the anomaly situation to be suitably handled without interfering with the communication area managed by the small aircraft 500 that has been managed by the large aircraft 400 in which the anomaly has occurred.

Figure 12:
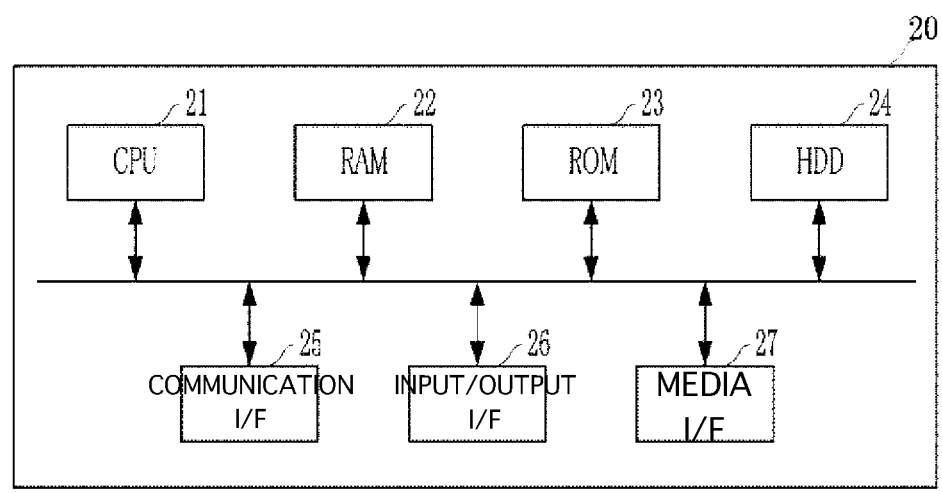
FIG. 12 is a hardware configuration diagram illustrating an example of a computer capable of implementing the communication management device according to examples 1 and 2.

FIG. 12 is a hardware configuration diagram illustrating an example of a computer 20 capable of implementing the communication management devices 110, 410 according to examples 1 and 2. As shown in FIG. 12, the computer 20 includes a central processing unit (CPU) 21, a random access memory (RAM) 22, a read only memory (ROM) 23, a hard disk drive (HDD) 24, a communication interface (I/F) 25, an input/output interface (I/F) 26, and a media interface (I/F) 27.

The CPU 21 operates by a program stored in the ROM 23 or HDD 24 and controls the portions. The ROM 23 stores a boot program to be executed by the CPU 21 at the time of starting up of the computer 20, and a program dependent on the hardware of the computer 20, for example.

The HDD 24 stores a program executed by the CPU 21 and data used by the program, for example. The communication interface 25 transmits the data received from the external device via the communication line to the CPU 21, and the data generated by the CPU 21 is transmitted to the external device via the communication line.

The CPU 21 controls the input device via the input/output interface 26. The CPU 21 acquires data from the input device via the input/output interface 26. The CPU 21 also outputs the generated data to an output device via the input/output interface 26.

The media interface 27 reads a program or data stored in the storage medium 28 and provides it to the CPU 21 via the RAM 22. The CPU 21 loads the program onto the RAM 22 from the storage medium 28 via the media interface 27, and executes the loaded program. The storage medium 28 may include, for example, an optical storage medium such as a digital versatile disc (DVD), a magnetic storage medium, or a semiconductor memory.

When the computer 20 functions as the communication management devices 110, 410 in this example, the CPU 21 of the computer 20 executes a program loaded on the RAM 22 to embody the functions of the first communication units 121, 421, the third communication units 423, 422, the second communication unit 122, the airframe controller 124, the management unit 125, the acquisition units 126, 426, the detection unit 127, and the diagnosis unit 128. In addition, the data in the control condition database 131 is stored in the HDD 24.

The communication management program is provided in an installable or executable format file stored in a computer-readable storage medium such as a CD-ROM, CD-R, memory card, digital versatile disk (DVD), or flexible disk (FD), for example. Although the CPU 21 of the computer 20 reads and executes these programs from the above-described storage medium via the media interface 27, as another example, these programs may be acquired from an external device via a communication line.

The communication management program may be implemented using, for example, a scripting language such as ActionScript, JAVASCRIPT (registered trademark), Python, or Ruby, or a compiler language such as C, C++, C#, Objective-C, Swift, or JAVA (registered trademark).

What is claimed is:

1. A communication management device disposed in a flight vehicle that communicates with a base station management device that manages a plurality of base stations, the communication management device comprising:
    a first communication unit that transmits and receives control signals of an airframe of the flight vehicle or flight information of the flight vehicle to and from the base station management device;
    a second communication unit that provides communications among a plurality of wireless terminals as the base station;
    an acquisition unit that acquires anomaly information indicating that an anomaly of the first communication unit or an anomaly of a flight status of the flight vehicle has occurred; and
    an anomaly reporting unit that transmits the anomaly information to the base station management device via the second communication unit when the anomaly information is acquired by the acquisition unit,
wherein the first communication unit, the second communication unit, and the acquisition unit are interconnected by an internal network;
further comprising an airframe controller that controls an airframe of the flight vehicle in accordance with the control signals received by the first communication unit, wherein
    the airframe controller turns off control of the airframe by the control signals when the anomaly information is acquired by the acquisition unit, and controls the airframe by an autonomous flight mode as a control predetermined as a flight mode when the anomaly information is acquired; and
wherein
    the first communication unit, the second communication unit, the acquisition unit, and the airframe controller are interconnected by an internal network,
    the anomaly reporting unit is provided outside the internal network,
    when the acquisition unit acquires the anomaly information, the acquisition unit transmits the anomaly information to the anomaly reporting unit using an emergency line, and
    when the anomaly reporting unit receives the anomaly information from the acquisition unit, the anomaly reporting unit transmits the anomaly information to the base station management device via the second communication unit using the emergency line.

2. The communication management device according to claim 1, further comprising:
    a detection unit that detects anomalies in communications by the first communication unit, and
    a diagnosis unit that diagnoses the flight status, wherein
    the acquisition unit acquires the anomaly information from the detection unit or the diagnosis unit when an anomaly in a communication by the first communication unit is detected by the detection unit or when the flight status is diagnosed as an anomaly by the diagnosis unit.

3. The communication management device according to claim 2, wherein the acquisition unit acquires the anomaly information from the base station management device when the anomaly in the communication by the first communication unit is detected by the base station management device, or when the flight status is diagnosed as the anomaly by the diagnosis unit.

4. The communication management device according to claim 1, wherein when the anomaly information is acquired by the acquisition unit, the airframe controller turns off control of an airframe by the airframe controller, and the airframe controller performs, as the autonomous flight mode, one of a control to increase a flight altitude of the airframe, control to move the airframe to a predetermined safe airspace, control to return the airframe to a predetermined airport, control to land the airframe on the ground, and land the airframe on water.

5. The communication management device according to claim 1, further comprising a storage that stores control conditions to rank an order of a plurality of controls to be executed as the autonomous flight mode, wherein
    the airframe controller controls the airframe according to an order indicated by the control conditions when the anomaly information is acquired by the acquisition unit.

6. The communication management device according to claim 5, wherein
    the storage stores control conditions that specify, in an order of execution, control to increase a flight altitude of the airframe, control to move the airframe to a predetermined safe airspace, control to return the airframe to a predetermined airport, control to land the airframe on the ground, and control to land the airframe on water, and
    the airframe controller controls the airframe according to an order indicated by the control conditions when the anomaly information is acquired by the acquisition unit.

7. A communication management system including a base station management device that manages a plurality of base stations and a communication management device provided in a flight vehicle, wherein
    the communication management device includes:
        a first communication unit that transmits and receives control signals of an airframe of the flight vehicle or flight information of the flight vehicle to and from the base station management device;
        a second communication unit that provides communications among a plurality of wireless terminals as the base station;

an acquisition unit that acquires anomaly information indicating that an anomaly of the first communication unit or an anomaly of a flight status of the flight vehicle has occurred; and an anomaly reporting unit that transmits the anomaly information to the base station management device via the second communication unit when the anomaly information is acquired by the acquisition unit, wherein the first communication unit, the second communication unit, and the acquisition unit are interconnected by an internal network.

8. A communication management method executed by a communication management device installed in a flight vehicle that communicates with a base station management device that manages a plurality of base stations, the method comprising the steps of:

a first communication step of transmitting and receiving, via a first communication unit, control signals of an airframe of the flight vehicle or flight information of the flight vehicle to and from the base station management device;

a second communication step of providing communications, via a second communication unit, among a plurality of wireless terminals as the base station;

an acquisition step of acquiring, via an acquisition unit, an anomaly information indicating that an anomaly in the first communication step or an anomaly in a flight status of the flight vehicle has occurred; and an anomaly reporting step of transmitting the anomaly information, via an anomaly reporting unit, to the base station management device via the second communication step when the anomaly information is acquired in the acquisition step, further comprising controlling, via an airframe controller, an airframe of the flight vehicle in accordance with the control signals received by the first communication unit, wherein the airframe controller turns off control of the airframe by the control signals when the anomaly information is acquired by the acquisition unit, and controls the airframe by an autonomous flight mode as a control predetermined as a flight mode when the anomaly information is acquired; and wherein the first communication unit, the second communication unit, the acquisition unit, and the airframe controller are interconnected by an internal network, the anomaly reporting unit is provided outside the internal network, when the acquisition unit acquires the anomaly information, the acquisition unit transmits the anomaly information to the anomaly reporting unit using an emergency line, and when the anomaly reporting unit receives the anomaly information from the acquisition unit, the anomaly reporting unit transmits the anomaly information to the base station management device via the second communication unit using the emergency line.

9. A non-transitory computer readable recording medium storing therein a communication management program causing a computer to execute:

a first communication function that that transmits and receives control signals of an airframe of a flight vehicle or flight information of the flight vehicle to and from the base station management device that manages a plurality of base stations;

a second communication function that provides communications among a plurality of wireless terminals as the base station;

an acquisition function that acquires anomaly information indicating that an anomaly of the first communication function or an anomaly of a flight status of the flight vehicle has occurred; and an anomaly reporting function that transmits the anomaly information to the base station management device via the second communication function when the anomaly information is acquired by the acquisition function, wherein the first communication function, the second communication function, and the acquisition function are interconnected by an internal network;

further comprising an airframe controller function that controls an airframe of the flight vehicle in accordance with the control signals received by the first communication function, wherein the airframe controller function turns off control of the airframe by the control signals when the anomaly information is acquired by the acquisition function, and controls the airframe by an autonomous flight mode as a control predetermined as a flight mode when the anomaly information is acquired; and wherein the first communication function, the second communication function, the acquisition function, and the airframe controller function are interconnected by an internal network, the anomaly reporting function is provided outside the internal network, when the acquisition function acquires the anomaly information, the acquisition function transmits the anomaly information to the anomaly reporting function using an emergency line, and when the anomaly reporting function receives the anomaly information from the acquisition function, the anomaly reporting function transmits the anomaly information to the base station management device via the second communication function using the emergency line.

* * * * *